Figure 3:
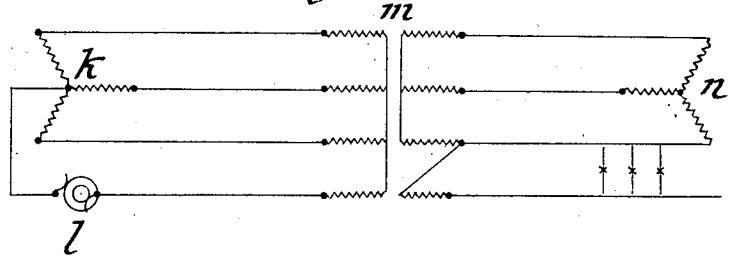

No. 686,434. Patented Nov. 12, 1901.
E. ARNOLD, O. S. BRAGSTAD & J. L. LA COUR.
DISTRIBUTION OF ELECTRIC CURRENTS.
(Application filed Jan. 26, 1901.)
(No Model.) 2 Sheets—Sheet 1.
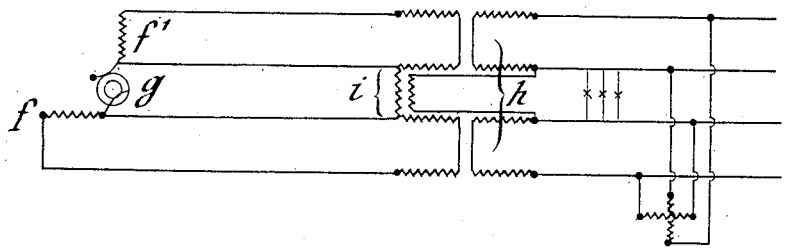
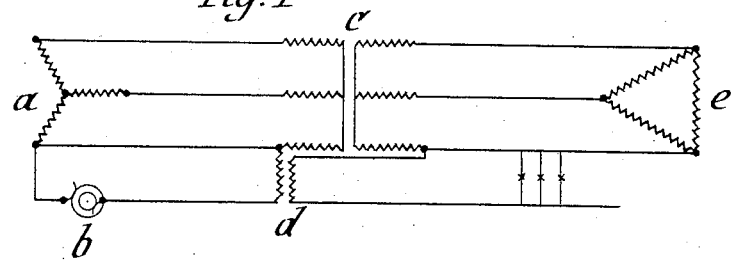
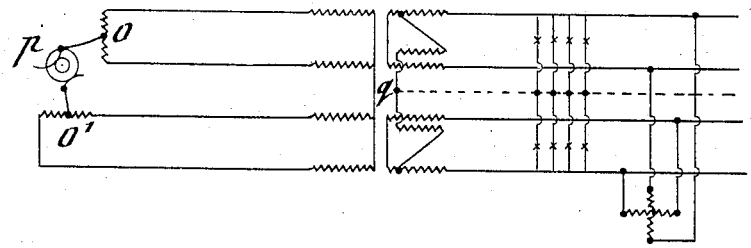
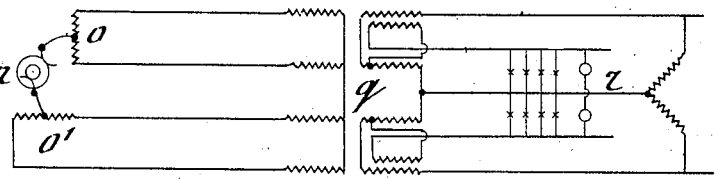

No. 686,434. Patented Nov. 12, 1901.
E. ARNOLD, O. S. BRAGSTAD & J. L. LA COUR.
DISTRIBUTION OF ELECTRIC CURRENTS.
(Application filed Jan. 26, 1901.)
(No Model.) 2 Sheets—Sheet 2.

UNITED STATES PATENT OFFICE.

ENGELBERT ARNOLD, OLE SIVERT BRAGSTAD, AND JENS LASSEN LA COUR, OF CARLSRUHE, GERMANY.

DISTRIBUTION OF ELECTRIC CURRENTS.

SPECIFICATION forming part of Letters Patent No. 686,434, dated November 12, 1901.

Application filed January 26, 1901. Serial No. 44,853. (No model.)

*To all whom it may concern:*

Be it known that we, ENGELBERT ARNOLD, professor, a subject of the Emperor of Germany, OLE SIVERT BRAGSTAD, electrical engineer, a subject of the King of Sweden and Norway, and JENS LASSEN LA COUR, electrical engineer, a subject of the King of Denmark, all residing at Carlsruhe, in the Grand Duchy of Baden, Germany, have invented certain new and useful Improvements in the Distribution of Electric Currents, of which the following is a specification.

The advantage with regard to economy of copper in the transmission of several alternating currents of different frequency by means of one and the same conduction are explained in the application, Serial No. 41,630, filed December 31, 1900, for a patent entitled "a system for the distribution of electric currents for independent polycyclic currents." Further, therein the advantage of employment of currents of different frequency is also described.

The system of distribution hereinafter described has the same object as that of the application referred to, especially when used in combination with the same, because the two systems in many relations reciprocally supplement each other. The separated conduction of the different currents in secondary networks or in all networks of distribution is not necessary in this system as it is by the first system when choking-coils are not used at the neutral points of which the current is taken off. If the point of connection of the superposed current be displaced from the neutral point to a terminal of the polyphase system, which can at will be star or ring connected, the current-receiving apparatus serving for taking off the superposed current can be connected between the conductor issuing from this terminal and a second conductor. Thereby two systems are produced which possess one terminal and the conductor appertaining in common. The current of one system when the other system is unloaded can only flow through the common conductor; but when the other system is loaded then the current of the first system can take two ways from the generator or transformers to the place of consumption—namely, one way through the common conductor and the second way through the other system and its receiving apparatus. From this it follows that both systems are theoretically not independent of each other. Practically, however, the alteration of the tension of one system by a great change of the load of the other system is negligible. This originates the name "dependent polycyclic-current distribution." Of course the system can as well be employed for the primary part of a power transmission. This gives, however, smaller advantages, because the transformation of the two currents in general must be effected separately.

In the following two sheets of drawings, Sheet 1 contains Figures 1 to 4, and Sheet 2 contains Figs. 5 to 8.

Fig. 1 shows, by way of example, the simultaneous employment of one conductor for the transmission of a single-phase alternating current and of the current of one phase of a three-phase system of other frequency. The arrangement of primary and secondary is the same. $a$ represents a three-phase generator; $b$, the single-phase generator. $c$ is a three-phase transformer, while $d$ is a single-phase transformer, and $e$ a three-phase motor.

Fig. 2 gives, by way of example, the employment of two conductors of an unlinked four-phase system for the simultaneous transmission of a single-phase alternating current. Here the arrangement of primary and secondary is the same. $f$ and $f'$ are the two separated windings of a four-phase generator. $g$ is the single-phase generator; $h$, the four-phase transformer; $i$, the single-phase transformer.

If the system described in the application above referred to is employed for the primary part and the dependent system for the secondary part, then instead of the arrangements of Figs. 1 and 2 the connections represented in Figs. 3, 4, and 4ª are obtained.

$k$ in Fig. 3 is the three-phase generator; $l$, the single-phase generator; $m$, a four-core three-phase transformer, and $n$ a three-phase motor.

In Figs. 4 and 4ª, $p$ represents the single-phase generator, $o$ and $o'$ the independent circuits of the four-phase generator, while $q$ is the four-core four-phase transformer. In Fig. 4 at the outer cores the secondary windings of the superposed system and those of the main system are partly in common, while both conductors are used simultaneously for the transmission of both currents. Fig. 4ᵃ gives a three-wire four-phase network in the secondary part, the common return-conductor $r$ of which serves simultaneously as middle conductor of the superposed system. Further, a part of the secondary windings of the inner cores serves to simultaneously receive the superposed current and the main current.

Figure 6:
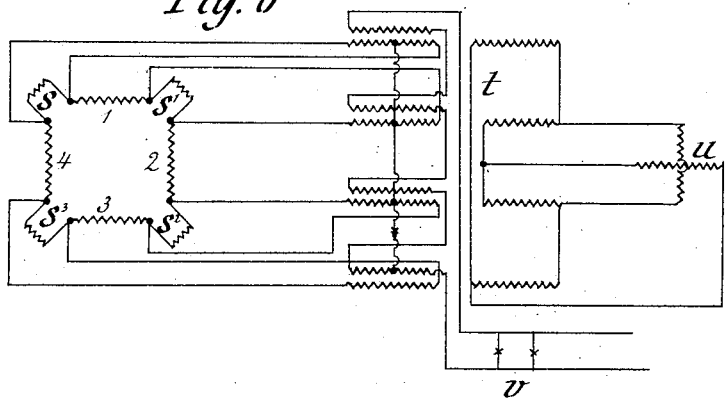
Figure 7:
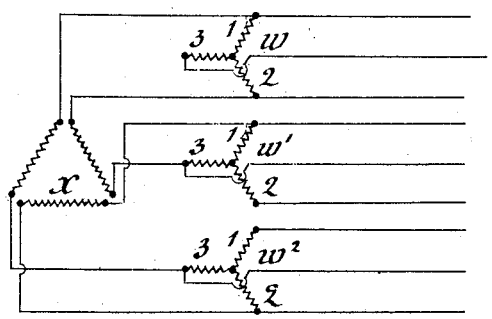
Figure 5:
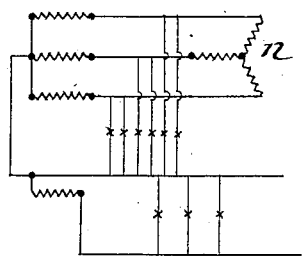

Fig. 5 shows the secondary networks for three and single phase systems which can be used instead of the secondary network shown in Fig. 3. The difference of this arrangement consists in the employment of the null (neutral) conductor instead of one external conductor of the three-phase system. Fig. 6 gives four similar and similar-phased single-phase generators $s$ $s'$ $s^2$ $s^3$. Between every two like-named terminals of these generators is singly connected, each at a time, one phase of a four-phase generator. By aid of a four-core four-phase transformer $t$ the different currents can be separated. The currents of the four-phase system serve to drive the four-phase motor $u$ and the single-phase current for feeding the network of the incandescent lamps $v$. Fig. 7 gives a similar connection for four three-phase systems, of which the three $w$ $w'$ $w^2$ are similar and similar-phased, while the fourth $x$ can be of any frequency.

What we claim as our invention, and desire to secure by Letters Patent of the United States, is—

1. In a system for the simultaneous transmission and distribution of alternating electric currents of different frequency, the combination with primary sources of energy generating alternating electric currents, and circuits therefor, of other sources of energy generating currents of different frequency from those of the primary sources, and connected to the circuits of the primary sources in such manner that pairs of the sources of energy, generating currents of different frequency, have conductors in common, substantially as described.

2. In a system for the simultaneous transmission and distribution of alternating electric currents of different frequency, the combination with primary sources of energy generating alternating electric currents, and circuits therefor, of other sources of energy generating currents of different frequency from those of the primary sources, and connected to the circuits of the primary sources in such manner that pairs of the sources of energy, generating currents of different frequency, have conductors in common, and a transformer connected to the system, having secondary circuits for deriving currents of different frequency from the sources of energy, substantially as described.

3. In a system for the simultaneous transmission and distribution of alternating electric currents of different frequency, the combination with a primary source of energy generating alternating electric currents, and a circuit therefor, of a second source of energy, generating currents of different frequency from those of the primary source and connected to a circuit of the primary source in such manner that the circuit of each source of energy possesses a common conductor, and a transformer for both sources of energy, the secondary circuits of which, for deriving current from each source of energy, respectively, have a conductor in common, substantially as described.

4. In a system for the simultaneous transmission and distribution of alternating electric currents of different frequency, the combination with a primary source of energy generating alternating electric currents, and a circuit therefor, of a second source of energy generating currents of different frequency from those of the primary source, and connected between points of equal potential in the system, and a transformer for both sources of energy, the secondary circuits of which, for deriving current from each source of energy, respectively, have a conductor in common, substantially as described.

5. In a system for the simultaneous transmission and distribution of alternating electric currents of different frequency, the combination with a primary source of energy generating alternating electric currents, and a circuit therefor, of a second source of energy generating currents of different frequency from those of the primary source, and connected between points of equal potential in the system, and a transformer for both sources of energy, the secondary circuits of which, for deriving current from each source of energy, respectively, have conductors in common, substantially as described.

In testimony whereof we have signed our names to this specification in the presence of two subscribing witnesses.

ENGELBERT ARNOLD.
OLE SIVERT BRAGSTAD.
JENS LASSEN LA COUR.

Witnesses:
JACOB ADRIAN,
H. W. HARRIS.